United States Patent
Islam et al.

(10) Patent No.: US 10,412,702 B2
(45) Date of Patent: *Sep. 10, 2019

(54) DECLARING QUASI CO-LOCATION AMONG MULTIPLE ANTENNA PORTS

(71) Applicant: QUALCOMM Incorporated, San Diego, CA (US)

(72) Inventors: Muhammad Nazmul Islam, Edison, NJ (US); Sundar Subramanian, San Diego, CA (US); Tingfang Ji, San Diego, CA (US); Yu Zhang, Beijing (CN); Navid Abedini, Raritan, NJ (US); Bilal Sadiq, Basking Ridge, NJ (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/044,453

(22) Filed: Jul. 24, 2018

(65) Prior Publication Data
US 2018/0352533 A1    Dec. 6, 2018

Related U.S. Application Data

(63) Continuation of application No. 15/443,449, filed on Feb. 27, 2017, now Pat. No. 10,039,076.
(Continued)

(51) Int. Cl.
| | |
|---|---|
| *H04W 64/00* | (2009.01) |
| *H04W 72/04* | (2009.01) |

(Continued)

(52) U.S. Cl.
CPC .......... *H04W 64/006* (2013.01); *H04B 7/024* (2013.01); *H04B 7/063* (2013.01);
(Continued)

(58) Field of Classification Search
CPC .......... H04W 64/006; H04W 72/0413; H04W 72/042; H04W 88/08; H04W 88/02; H04W 88/021
(Continued)

(56) References Cited

U.S. PATENT DOCUMENTS

| | | | |
|---|---|---|---|
| 9,307,521 B2 | 4/2016 | Ng et al. | |
| 2004/0095907 A1 | 5/2004 | Agee et al. | |

(Continued)

FOREIGN PATENT DOCUMENTS

WO    2014112938 A1    7/2014

OTHER PUBLICATIONS

Intel Corporation: "On the Need of New QCL Parameters in NR", 3GPP DRAFT; R1-166563, 3rd Generation Partnership Project(3GPP), Mobile Competence Centre; 650, Route Des Lucioles; F-06921, Sophia-Antipolis Cedex; France, vol. RAN WG1, No. Gothenburg, Sweden; Aug. 13, 2016, XP051132848, Retrieved from the Internet: URL: http://www.3gpp.org/ftp/tsg_ran/WG1_RL1/TSGR1_86/Docs/ [retrieved on Aug. 13, 2016], 4 pages.

(Continued)

*Primary Examiner* — Inder P Mehra
(74) *Attorney, Agent, or Firm* — Arent Fox LLP

(57) ABSTRACT

Antenna ports on wireless devices may be QCL. QCL antenna ports may be useful in improving channel statistics related to the antenna ports. UEs and base stations may be able to determine candidate QCL ports, transmit information identifying the candidate QCL ports, and receive feedback indicating whether the candidate QCL ports are QCL at the receiving device such as a UE or a base station.

18 Claims, 13 Drawing Sheets

Related U.S. Application Data

(60) Provisional application No. 62/378,154, filed on Aug. 22, 2016, provisional application No. 62/378,637, filed on Aug. 23, 2016.

(51) Int. Cl.
  *H04W 88/02* (2009.01)
  *H04W 88/08* (2009.01)
  *H04B 7/06* (2006.01)
  *H04B 7/024* (2017.01)
  *H04L 5/00* (2006.01)

(52) U.S. Cl.
  CPC ......... *H04B 7/0617* (2013.01); *H04L 5/0035* (2013.01); *H04W 72/042* (2013.01); *H04W 72/0413* (2013.01); *H04L 5/0091* (2013.01); *H04W 88/02* (2013.01); *H04W 88/08* (2013.01)

(58) Field of Classification Search
  USPC .... 445/441, 509, 511, 507, 424, 421, 422.1, 445/425, 426.1, 460, 462, 517, 74.1, 445/550.1, 554.2, 551, 558; 342/367; 370/310.2
  See application file for complete search history.

(56) References Cited

U.S. PATENT DOCUMENTS

| | | |
|---|---|---|
| 2014/0092827 A1 | 4/2014 | Joengren et al. |
| 2014/0169319 A1 | 6/2014 | Yang et al. |
| 2015/0029966 A1 | 1/2015 | Park et al. |
| 2015/0349855 A1 | 12/2015 | Sesia et al. |
| 2016/0088596 A1 | 3/2016 | Frenne et al. |
| 2016/0173183 A1 | 6/2016 | Kang et al. |
| 2016/0248561 A1 | 8/2016 | Davydov et al. |
| 2016/0249279 A1* | 8/2016 | Koorapaty ............ H04W 48/16 |
| 2016/0302203 A1* | 10/2016 | Liu ........................ H04L 5/001 |
| 2018/0041319 A1 | 2/2018 | Cheng et al. |
| 2018/0054797 A1 | 2/2018 | Islam et al. |
| 2018/0352533 A1* | 12/2018 | Islam ................... H04B 7/0617 |

OTHER PUBLICATIONS

International Search Report and Written Opinion—PCT/US2017/044696—ISA/EPO—dated Nov. 14, 2017.
ZTE: "Quasi Co-Location of Antenna Ports for FD-MIMO", 3GPP DRAFT; R1-156824, 3rd Generation Partnership Project(3GPP), Mobile Competence Centre; 650, Route Des Lucioles; F-06921, Sophia-Antipolis Cedex; France, vol. RAN WG1, No. Anaheim, USA; Nov. 15, 2015, XP051003184, Retrieved from the Internet: URL:http://www.3gpp.org/ftp/Meetings_3GPP_SYNC/RAN1/Docs/ [retrieved on Nov. 15, 2015], 3 pages.

* cited by examiner

DECLARING QUASI CO-LOCATION AMONG MULTIPLE ANTENNA PORTS

CROSS-REFERENCE TO RELATED APPLICATION(S)

This application is a continuation of U.S. patent application Ser. No. 15/443,449, which claims the benefit of U.S. Provisional Application Ser. No. 62/378,154, entitled "DECLARING QUASI CO-LOCATION AMONG MULTIPLE ANTENNA PORTS" and filed on Aug. 22, 2016 and U.S. Provisional Application Ser. No. 62/378,637, entitled "DECLARING QUASI CO-LOCATION AMONG MULTIPLE ANTENNA PORTS" and filed on Aug. 23, 2016, each of which is expressly incorporated by reference herein in its entirety.

BACKGROUND

Field

The present disclosure relates generally to communication systems, and more particularly, to declaring quasi co-location (QCL) among multiple antenna ports.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

Antenna ports on wireless devices may be quasi co-located. QCL antenna ports may be useful in improving channel statistics related to the antenna ports.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Antenna ports on wireless devices may be quasi co-located. QCL antenna ports may be useful in improving channel statistics related to the antenna ports.

In an aspect of the disclosure, a method, a computer-readable medium, and an apparatus are provided. The apparatus may be configured to determine a set of antenna ports that are QCL. The determination may be based on one or more of an angle of arrival at the apparatus, angle of departure from the apparatus, and a beam width for each antenna port of the set of antenna ports. The apparatus may be configured to transmit QCL information to a UE indicating that the set of antenna ports are determined to be QCL.

In another aspect, an apparatus for wireless communication is provided. The apparatus may include mean for determining a set of antenna ports that are QCL. The determination may be based on one or more of an angle of arrival at the apparatus, angle of departure from the apparatus, and a beam width for each antenna port of the set of antenna ports. The apparatus may include means for transmitting QCL information to a UE indicating that the set of antenna ports are determined to be QCL.

In another aspect, a computer-readable medium is provided. The computer-readable medium may include computer executable code to determine a set of antenna ports that are QCL. The determination may be based on one or more of an angle of arrival at the apparatus, angle of departure from the base station, and a beam width for each antenna port of the set of antenna ports. The computer-readable medium may include code to transmit QCL information to a UE indicating that the set of antenna ports are determined to be QCL.

In another aspect of the disclosure a method, a computer-readable medium, and an apparatus are provided. The apparatus may be configured to receive information from a UE indicating that a set of antenna ports at the UE are QCL, to receive signals from the set of antenna ports based on the received information, and to determine whether the set of antenna ports are QCL based on the received signals. In an aspect, the determination may be based on receiving signals from all ports within the set of antenna ports using a same receiver beam at the base station. In one configuration, the apparatus may determine that the set of antennas are QCL by measuring a quality of the received signals from the set of antenna ports. In one aspect, the measuring the quality of the received signal may include measuring one or more of a reference signal received power (RSRP), a received signal strength indicator (RSSI), a reference signal received quality (RSRQ), a signal to noise ratio (SNR), or a signal to interference plus noise ratio (SINR). In another configuration, the apparatus may be configured to transmit, based on the determination, feedback information to the UE indicating whether the set of antenna ports are QCL.

In another aspect, a method of wireless communication by a base station is provided. The method may include receiving information from a UE indicating that a set of antenna ports at the UE are QCL, receiving signals from the set of antenna ports based on the received information, and determining whether the set of antenna ports are QCL based on the received signals. In an aspect, the determination may be based on receiving signals from all ports within the set of antenna ports using a same receiver beam at the base station. In one configuration, the determining may include measuring a quality of the received signals from the set of antenna ports. In an aspect, the measuring the quality of the received signal may include measuring one or more of a reference signal received power (RSRP), a received signal strength indicator (RSSI), a reference signal received quality (RSRQ), a signal to noise ratio (SNR), or a signal to interference plus noise ratio (SINR). In another configuration, the method may include transmitting, based on the determination, feedback information to the UE indicating whether the set of antenna ports are QCL.

In another aspect, a base station for wireless communication is provided. The base station may include means for receiving information from a UE indicating that a set of antenna ports at the UE are QCL, means for receiving signals from the set of antenna ports based on the received information, and means for determining whether the set of antenna ports are QCL based on the received signals. In an aspect, the determination may be based on receiving signals from all ports within the set of antenna ports using a same receiver beam at the base station. In one configuration, the means for determining may be configured to measure a quality of the received signals from the set of antenna ports. In an aspect, the measuring the quality of the received signal may include measuring one or more of a reference signal received power (RSRP), a received signal strength indicator (RSSI), a reference signal received quality (RSRQ), a signal to noise ratio (SNR), or a signal to interference plus noise ratio (SINR). In another configuration, the base station may include means for transmitting, based on the determination, feedback information to the UE indicating whether the set of antenna ports are QCL.

In another aspect, a base station for wireless communication is provided. The base station may include a memory and at least one processor coupled to the memory and configured to receive information from a UE indicating that a set of antenna ports at the UE are QCL, to receive signals from the set of antenna ports based on the received information, and to determine whether the set of antenna ports are QCL based on the received signals. In an aspect, the determination may be based on receiving signals from all ports within the set of antenna ports using a same receiver beam at the base station. In one configuration, the at least one processor may be configured to determine by measuring a quality of the received signals from the set of antenna ports. In an aspect, the at least one processor may be configured to measure the quality of the received signal by measuring one or more of a reference signal received power (RSRP), a received signal strength indicator (RSSI), a reference signal received quality (RSRQ), a signal to noise ratio (SNR), or a signal to interference plus noise ratio (SINR). In another configuration, the at least one processor may be configured to transmit, based on the determination, feedback information to the UE indicating whether the set of antenna ports are QCL.

In another aspect, a computer-readable medium of a base station is provided. The computer-readable medium may include executable code to receive information from a UE indicating that a set of antenna ports at the UE are QCL, to receive signals from the set of antenna ports based on the received information, and to determine whether the set of antenna ports are QCL based on the received signals. In an aspect, the determination may be based on receiving signals from all ports within the set of antenna ports using a same receiver beam at the base station. In one configuration, the code to determine that the set of antennas are QCL may include code to measure a quality of the received signals from the set of antenna ports. In one aspect, the measuring the quality of the received signal may include measuring one or more of a reference signal received power (RSRP), a received signal strength indicator (RSSI), a reference signal received quality (RSRQ), a signal to noise ratio (SNR), or a signal to interference plus noise ratio (SINR). In another configuration, the computer-readable medium may include code to transmit, based on the determination, feedback information to the UE indicating whether the set of antenna ports are QCL.

In another aspect of the disclosure a method, a computer-readable medium, and an apparatus are provided. The apparatus may be configured to determine that a set of antenna ports at the UE are QCL and to transmit QCL information to a base station indicating that the set of antenna ports are determined to be QCL.

In another aspect, a UE for wireless communication is provided. The UE may include means for determining that a set of antenna ports at the UE are QCL and means for transmitting QCL information to a base station indicating that the set of antenna ports are determined to be QCL.

In another aspect, a computer-readable medium is provided. The computer-readable medium may include computer executable code to determine that a set of antenna ports at the UE are QCL and to transmit QCL information to a base station indicating that the set of antenna ports are determined to be QCL.

In another aspect of the disclosure a method, a computer-readable medium, and an apparatus are provided. The apparatus may be configured to receive information from a base station indicating that a set of antenna ports at the base station are QCL, to receive signals from the set of antenna ports, and to determine whether the set of antenna ports are QCL based on the received signals.

In another aspect, a method of wireless communication by a UE is provided. The method may include receiving information from a base station indicating that a set of antenna ports at the base station are QCL, receiving signals from the set of antenna ports based on the received information, and determining whether the set of antenna ports are QCL based on the received signals. In an aspect, the determination may be based on receiving signals from all ports within the set of ports using a same receiver beam at the UE. In another aspect, the determining may include measuring a quality of the receiving signals from the set of antenna ports. In another aspect, the measuring the quality of the signals may include measuring one or more of a reference signal received power (RSRP), a received signal strength indicator (RSSI), a reference signal received quality (RSRQ), a signal to noise ratio (SNR), or a signal to interference plus noise ratio (SINR). In another aspect, the method may include transmitting, based on the determination, feedback information to the base station indicating whether the set of antenna ports are QCL.

In another aspect, a UE for wireless communication is provided. The UE may include means for receiving information from a base station indicating that a set of antenna ports at the base station are QCL, means for receiving signals from the set of antenna ports based on the received information, and means for determining whether the set of antenna ports are QCL based on the received signals. In an aspect, the determination may be based on receiving signals from all ports within the set of ports using a same receiver beam at the UE. In another aspect, the means for determining may be configured to measure a quality of the receiving signals from the set of antenna ports. In another aspect, the measuring the quality of the signals may include measuring one or more of a reference signal received power (RSRP), a received signal strength indicator (RSSI), a reference signal received quality (RSRQ), a signal to noise ratio (SNR), or a signal to interference plus noise ratio (SINR). In another aspect, the UE may include means for transmitting, based on the determination, feedback information to the base station indicating whether the set of antenna ports are QCL.

In another aspect, a UE for wireless communication is provided. The UE may include a memory and at least one processor coupled to the memory and configured to receive information from a base station indicating that a set of antenna ports at the base station are QCL, to receive signals from the set of antenna ports based on the received information, and to determine whether the set of antenna ports are QCL based on the received signals. In an aspect, the determination may be based on receiving signals from all ports within the set of ports using a same receiver beam at the UE. In another aspect, the at least one processor may be configured to determine by measuring a quality of the receiving signals from the set of antenna ports. In another aspect, the measuring the quality of the signals may include measuring one or more of a reference signal received power (RSRP), a received signal strength indicator (RSSI), a reference signal received quality (RSRQ), a signal to noise ratio (SNR), or a signal to interference plus noise ratio (SINR). In another aspect, the at least one processor may be further configured to transmit, based on the determination, feedback information to the base station indicating whether the set of antenna ports are QCL.

In another aspect, a computer-readable medium of a UE is provided. The computer-readable medium may include executable code to receive information from a base station indicating that a set of antenna ports at the base station are QCL, to receive signals from the set of antenna ports based on the received information, and to determine whether the set of antenna ports are QCL based on the received signals. In an aspect, the determination may be based on receiving signals from all ports within the set of ports using a same receiver beam at the UE. In another aspect, the code to determine may include code to measure a quality of the receiving signals from the set of antenna ports. In another aspect, the code to measure the quality of the signals may include code to measure one or more of a reference signal received power (RSRP), a reference signal received quality (RSRQ), a signal to noise ratio (SNR), or a signal to interference plus noise ratio (SINR). In another aspect, the computer-readable medium may further include code to transmit, based on the determination, feedback information to the base station indicating whether the set of antenna ports are QCL.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
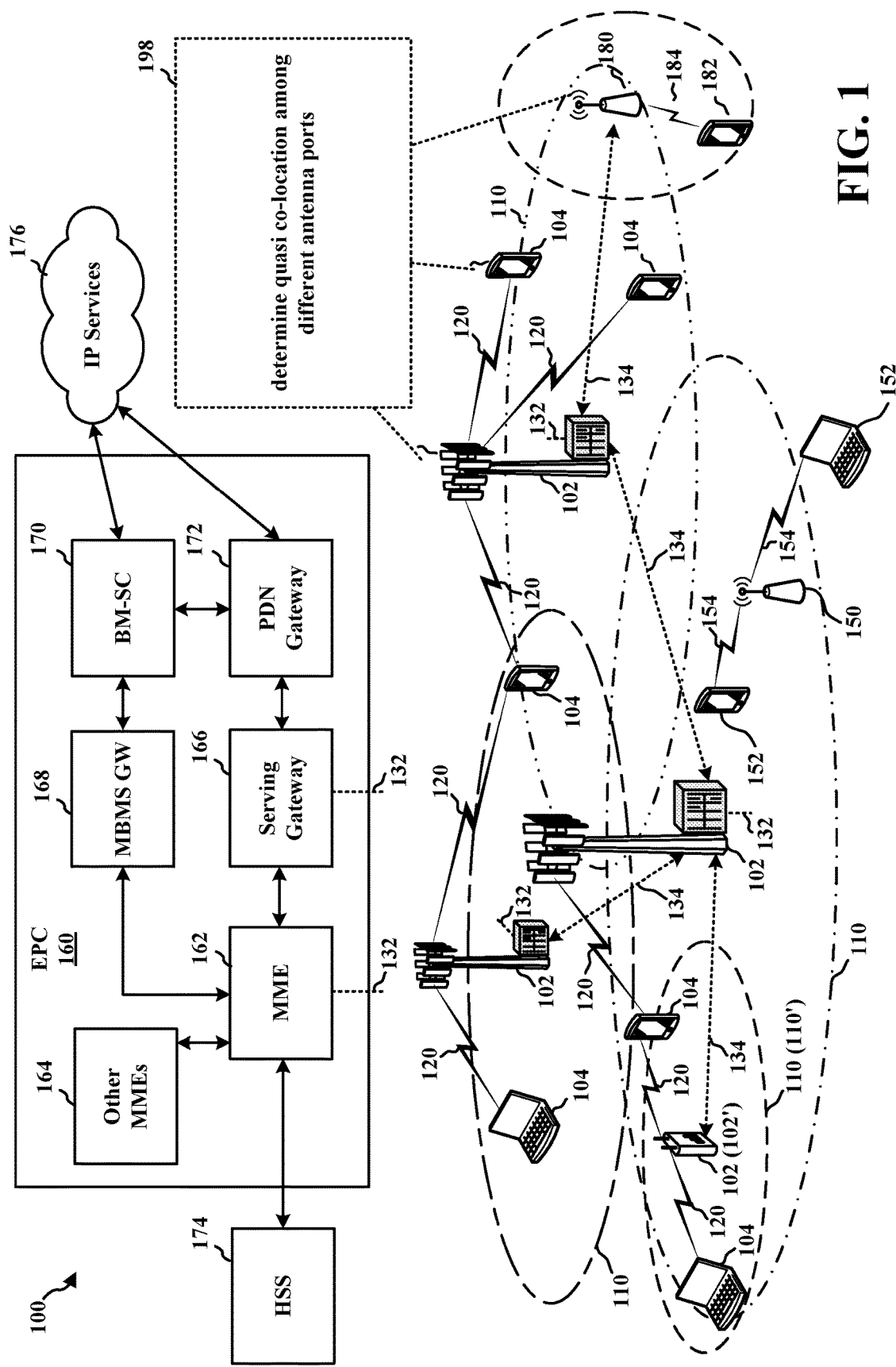
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 and the eNB 102 (and/or the mmW base station 180) may be configured to determine QCL among different antenna ports (198).

Figure 2:
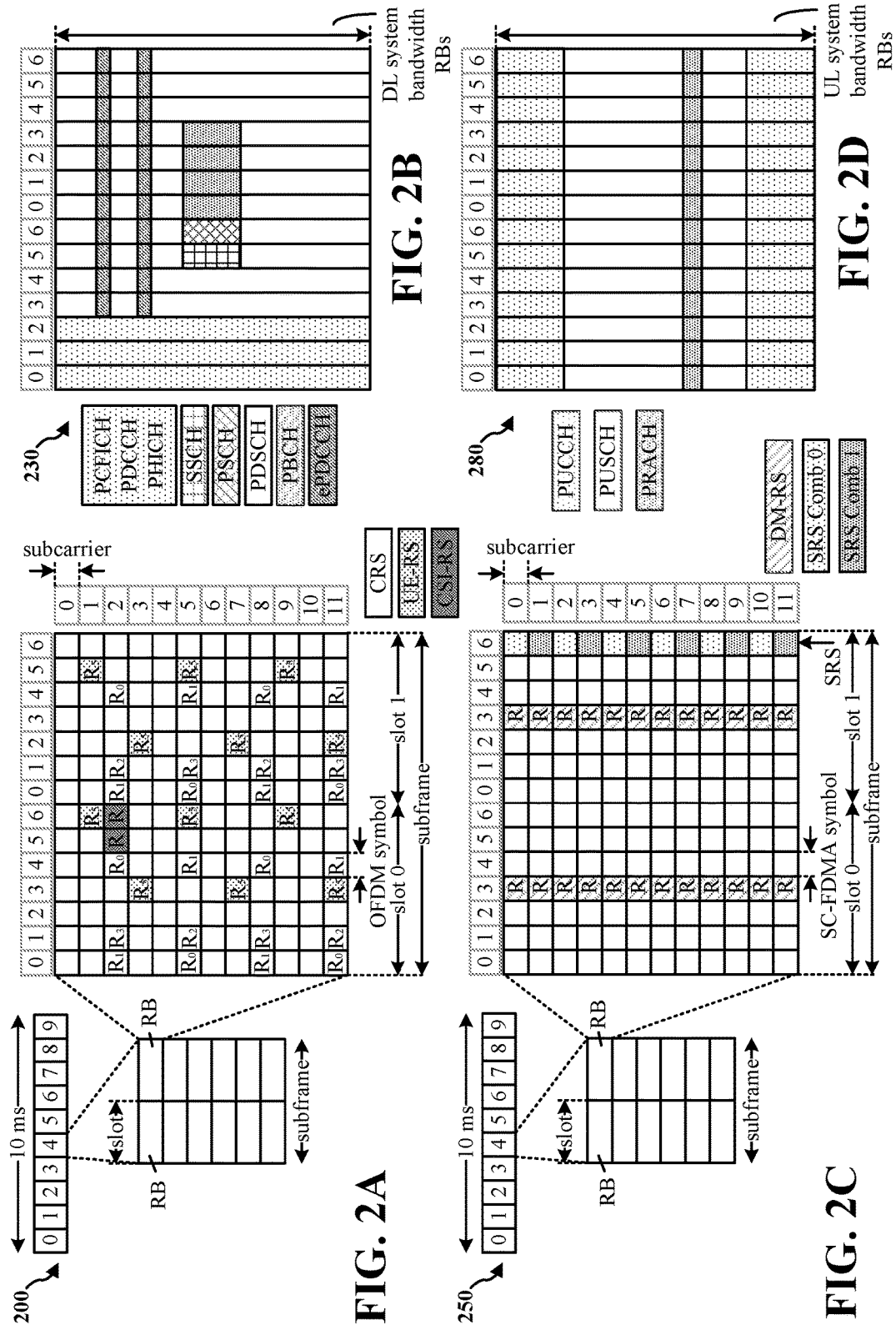
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
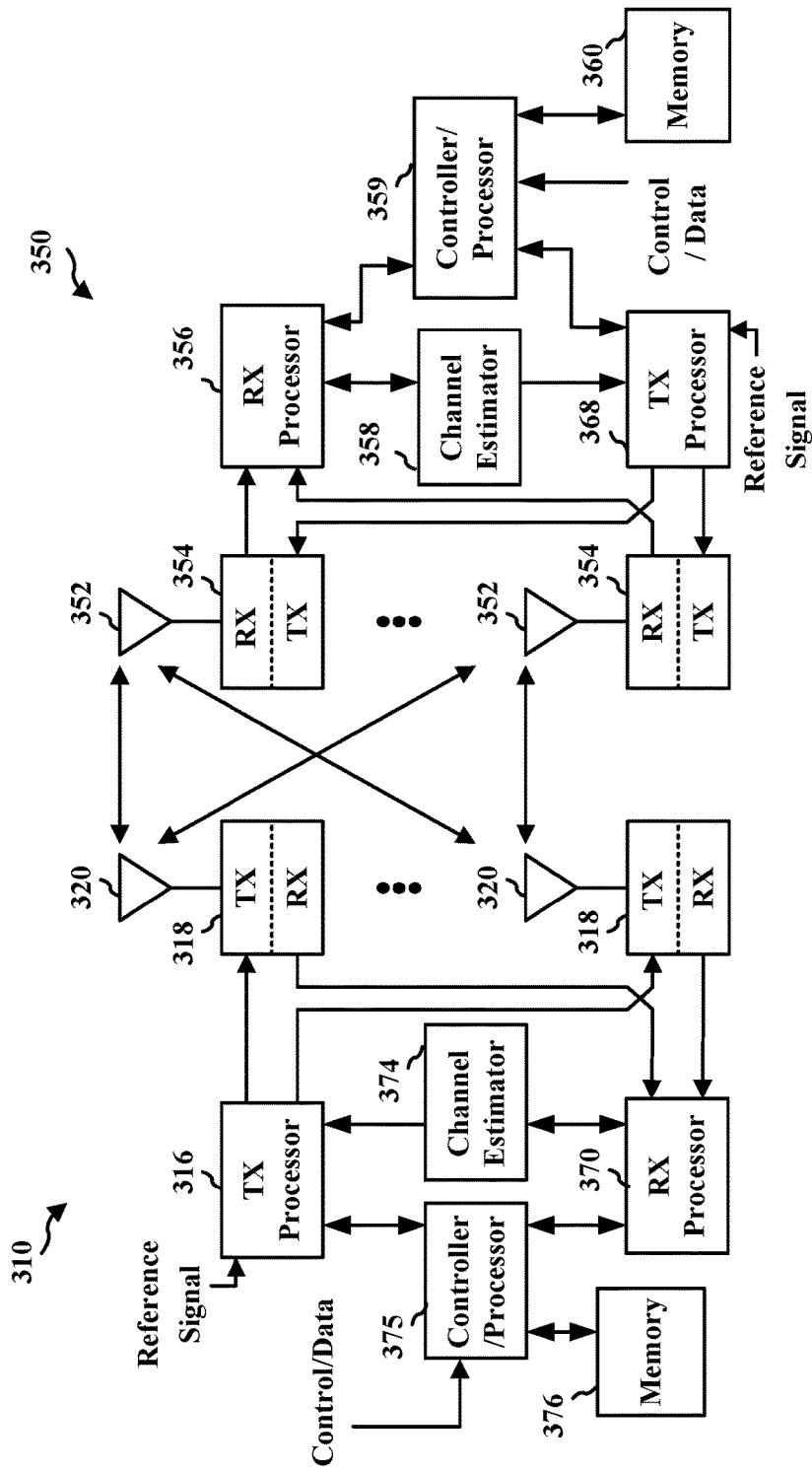
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
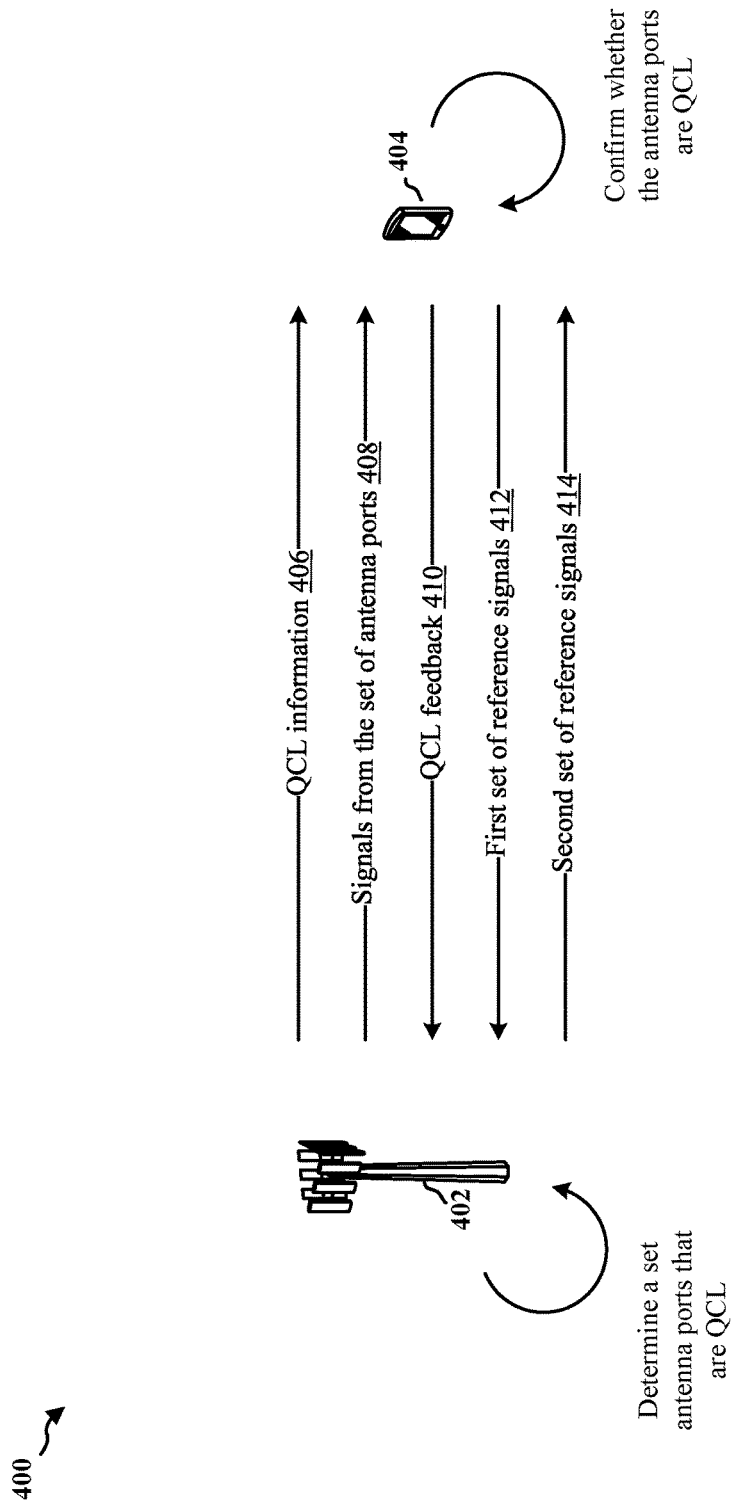
FIG. 4 is a diagram for determining QCL at a base station.

FIG. 4 is a diagram 400 for determining QCL at a base station. Referring to FIG. 4, a base station 402 (e.g., the mmW base station 180) may have multiple antenna ports, such as antenna ports A, B, C, and D. Each of the antenna ports may be associated with a subarray of antennas. The base station 402 may have any other number of antenna ports. The base station 402 may determine whether two or more of the antenna ports are quasi co-located. For example, the base station 402 may determine whether the antenna ports A and B are quasi co-located.

In one aspect, the base station 402 may determine that the antenna ports A and B are QCL based on the angles of departure from the base station 402 and the beam widths associated with each of the antenna ports. In one example, the antenna port A may have a 30 degree angle of departure, the antenna port B may have a 40 degree of departure, and the beam width associated with both ports may be 20 degrees. If the difference between the two angles of departure is less than or equal to the beam width, resulting in significant overlap between the beams, then the base station 402 may determine that the antenna ports A and B are QCL. In this example, the base station 402 may determine that the antenna ports A and B are QCL because the difference between the angles of departure is 10 degrees, which is less than the 20 degree beam widths. In another aspect, the base station 402 may determine that the antenna ports A and B are QCL if the angles of departure are the same, if the difference between the angles of departure are less than a threshold, or if the subarrays associated with the antenna ports are sufficiently close to each other (e.g., less than a distance threshold apart or adjacent).

The base station 402 may transmit QCL information 406 to a UE 404 indicating a set of antenna ports (e.g., antenna ports A and B) believed to be QCL. In an aspect, the QCL information 406 may include identifiers (e.g., port identifiers) associated with the antenna ports A and B. In another aspect, the transmission of the QCL information 406 may be beamformed to the UE 404. In another aspect, the QCL information 406 may be transmitted via the PDCCH or the PDSCH.

Upon receiving the QCL information 406, the UE 404 may confirm whether the UE 404 can receive signals 408 from the set of antenna ports identified in the QCL information 406 using the same antenna subarray and/or same beam at the UE 404. The same beam may refer to the received beam at the UE 404 based on an antenna beamforming configuration at the UE 404. Referring to FIG. 4, the signals 408, which may be beamformed, may include a first set of signals from antenna port A and a second set of signals from antenna port B. The UE 404 may be able to differentiate between the first set of signals and the second set of signals based on different pilot locations and waveforms, for example. The UE 404 may measure a reference signal received power (RSRP), a reference signal received quality (RSRQ), a received signal strength indicator (RSSI), a signal to noise ratio (SNR), and/or a signal to interference plus noise ratio (SINR) on the first set of signals and the second set of signals. The RSRP may indicate the average reference signal power received across a specified bandwidth (e.g., a number of resource elements). The RSRQ may indicate the quality of the received reference signal as a function of a number of resource blocks over which an RSSI is measured $$RSRQ = N_{RB} \frac{RSRP}{RSSI},$$

where $N_{RB}$ may correspond to the number of physical resource blocks over which RSSI is measured). If the RSRP and/or RSRQ on both sets of signals are above a threshold, then the UE 404 may determine that the set of antenna ports are QCL. Otherwise, the UE 404 may determine that the set of antenna ports are not QCL. The UE 404 may transmit QCL feedback 410 on the set of antenna ports based on the determination. In an aspect, the QCL feedback 410 may be transmitted via the PUCCH or PUSCH.

If the QCL feedback 410 indicates that the set of antenna ports are QCL, then the base station 402 may determine to use the set of antenna ports for future communication. For example, the base station 402 may transmit signals to the UE 404 using the QCL set of antenna ports. Otherwise, if the QCL feedback 410 indicates that the set of antenna ports are not QCL, then the base station 402 may attempt to determine if other antenna ports at the base station 402 are QCL and attempt to transmit on those other antenna ports.

If the UE 404 confirms that the set of antenna ports are QCL, then the UE 404 may use the QCL relationship to determine large scale parameters such as the delay spread and the average gain of the antenna port A from the antenna port B. In an aspect, when the set of antenna ports are QCL, then the base station 402 may transmit the same information to the UE 404 using both of the set of antenna ports. The UE 404 may receive redundant information from the base station 402 based on the QCL antenna ports, and the UE 404 may perform channel estimation based on the received signals from the antennas ports. Due to the QCL relationship, the UE 404 may average the signals from the antenna ports or average the channel estimation results to obtain improved channel estimation. In another aspect, the base station 402 may transmit pilot signals via the antenna port A and data in antenna port B (because both the ports are co-located), which may improve throughput and resource utilization.

In an aspect, large scale parameters in LTE like delay spread, average gain, average delay, etc., may be used to define QCL of antenna ports. For example, signals that have a similar delay spread, average gain, and/or average delay may be more likely to be considered to be transmitted by (or received from) QCL antenna ports. Further, in addition to the angle of departure, the angle of arrival may also be considered when determining whether antenna ports are QCL.

Figure 5:
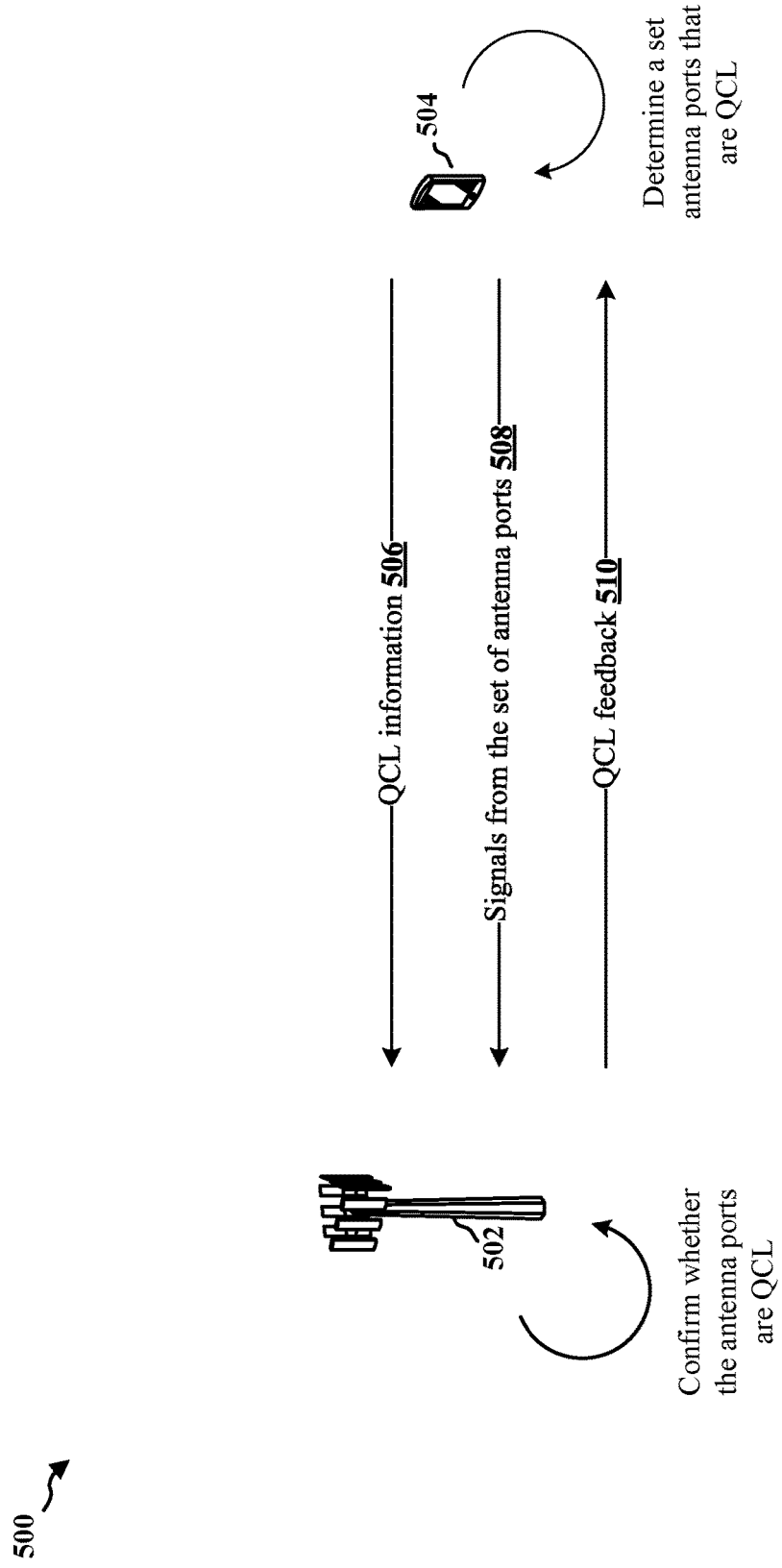
FIG. 5 is a diagram for determining QCL at a UE.

FIG. 5 is a diagram 500 for determining QCL at a UE. Referring to FIG. 5, a UE 504 (e.g., the UE 182) may have multiple antenna ports, such as antenna ports A, B, C, and D. Each of the antenna ports may be associated with a subarray of antennas. The UE 504 may have any other number of antenna ports. The UE 504 may determine whether two or more of the antenna ports are quasi co-located. For example, antenna ports A and B may be quasi co-located.

In one aspect, the UE 504 may determine that the antenna ports A and B are QCL based on the angles of departure from the UE 504 and the beam widths associated with each of the antenna ports. In one example, the antenna port A may have a 30 degree angle of departure, the antenna port B may have a 40 degree of departure, and the beam width associated with both ports may be 20 degrees. If the difference between the two angles of departure is less than or equal to the beam width, resulting in significant overlap between the beams, then the UE 504 may determine that the antenna ports A and B are QCL. In this example, the UE 504 may determine that the antenna ports A and B are QCL because the difference between the angles of departure is 10 degrees, which is less than the 20 degree beam widths. In another aspect, the UE 504 may determine that the antenna ports A and B are QCL if the angles of departure are the same, if the difference between the angles of departure are less than a threshold, or if the subarrays associated with the antenna ports are sufficiently close to each other (e.g., less than a distance threshold apart or adjacent).

The UE 504 may transmit QCL information 506 to a base station 502 indicating a set of antenna ports (e.g., antenna ports A and B) believed to be QCL. In an aspect, the QCL information 506 may include identifiers (e.g., port identifiers) associated with the antenna ports A and B. In another aspect, the transmission of the QCL information 506 may be beamformed to the base station 402. In another aspect, the QCL information 506 may be transmitted via the PUCCH or the PUSCH.

Upon receiving the QCL information 506, the base station 502 may confirm whether the base station 502 can receive signals 508 from the set of antenna ports identified in the QCL information 506 using the same antenna subarray and/or same beam at the base station 502. The same beam may refer to the received beam at the base station 502 based on an antenna beamforming configuration at the base station 502. Referring to FIG. 5, the signals 508, which may be beamformed, may include a first set of signals from antenna port A and a second set of signals from antenna port B. The base station 502 may be able to differentiate between the first set of signals and the second set of signals based on different pilot locations and waveforms, for example. The base station 502 may measure an RSRP, an RSRQ, an RSSI, SNR, and/or SINR on the first set of signals and the second set of signals. If the RSRP and/or RSRQ on both sets of signals are above a threshold, then the base station 502 may determine that the set of antenna ports are QCL. Otherwise, the base station 502 may determine that the set of antenna ports are not QCL. The base station 502 may transmit QCL feedback 510 on the set of antenna ports based on the determination. In an aspect, the QCL feedback 510 may be transmitted via the PDCCH or PDSCH.

If the QCL feedback 510 indicates that the set of antenna ports are QCL, then the UE 504 may determine to use the set of antenna ports for future communication. For example, the UE 504 may transmit signals to the base station 502 using the QCL set of antenna ports. Otherwise, if the QCL feedback 510 indicates that the set of antenna ports are not QCL, then the UE 504 may attempt to determine if other antenna ports at the UE 504 are QCL and attempt to transmit on those other antenna ports.

If the base station 502 confirms that the set of antenna ports are QCL, then the base station 502 may use the QCL relationship to determine large scale parameters such as the delay spread and the average gain of the antenna port A from the antenna port B. In an aspect, when the set of antenna ports are QCL, then the UE 504 may transmit the same information to the base station 502 using both of the set of antenna ports. The base station 502 may receive redundant information from the UE 504 based on the QCL antenna ports, and the base station 502 may perform channel estimation based on the received signals from the antennas ports. Due to the QCL relationship, the base station 502 may average the signals from the antenna ports or average the channel estimation results to obtain improved channel estimation. In another aspect, the UE 504 may transmit pilot signals via the antenna port A and data in antenna port B (because both the ports are co-located), which may improve throughput and resource utilization.

In addition to determining whether a set of antenna ports are QCL for purposes of transmission, wireless devices may also determine whether the set of antenna ports are QCL for purposes of reception. For example, referring to FIG. 4, the UE 404 may transmit a first set of reference signals 412 (e.g., sounding reference signals) to the base station 402 using the same subarray and/or beam. The base station 402 may receive the first set of reference signals 412 from the UE 404 using two different antenna ports at the base station 402 (e.g., antenna ports A and B or some other number of antenna ports). The base station 402 may compare a first signal received at antenna port A and a second signal received at antenna port B, for example, to determine whether the first and second signals are sufficiently similar. If so, then the base station 402 may determine that the antenna port A and the antenna port B are QCL for purposes of reception. Subsequently, the base station 402 may transmit a second set of reference signals 414 using the same two antenna ports A and B. If the UE 404 determines that that the UE 404 is able to receive the second set of reference signals 414 transmitted by the base station 402 using the same subarray and/or same beam, then the UE 404 may transmit feedback to the base station 402 that the antenna ports A and B are QCL. Upon receiving the feedback, the base station 402 may determine that the antenna ports A and B are QCL for purposes of transmitting signals to the UE 404 and for purposes of receiving signals from the UE 404. The base station 402 may transmit information to the UE 404 indicating that transmit and receive antenna ports A and B are QCL for transmitting signals to and receiving signals from the UE 404. The QCL reciprocity enables the base station 402 to determine that transmissions on the downlink and uplink may have similar quality.

Figure 6A:
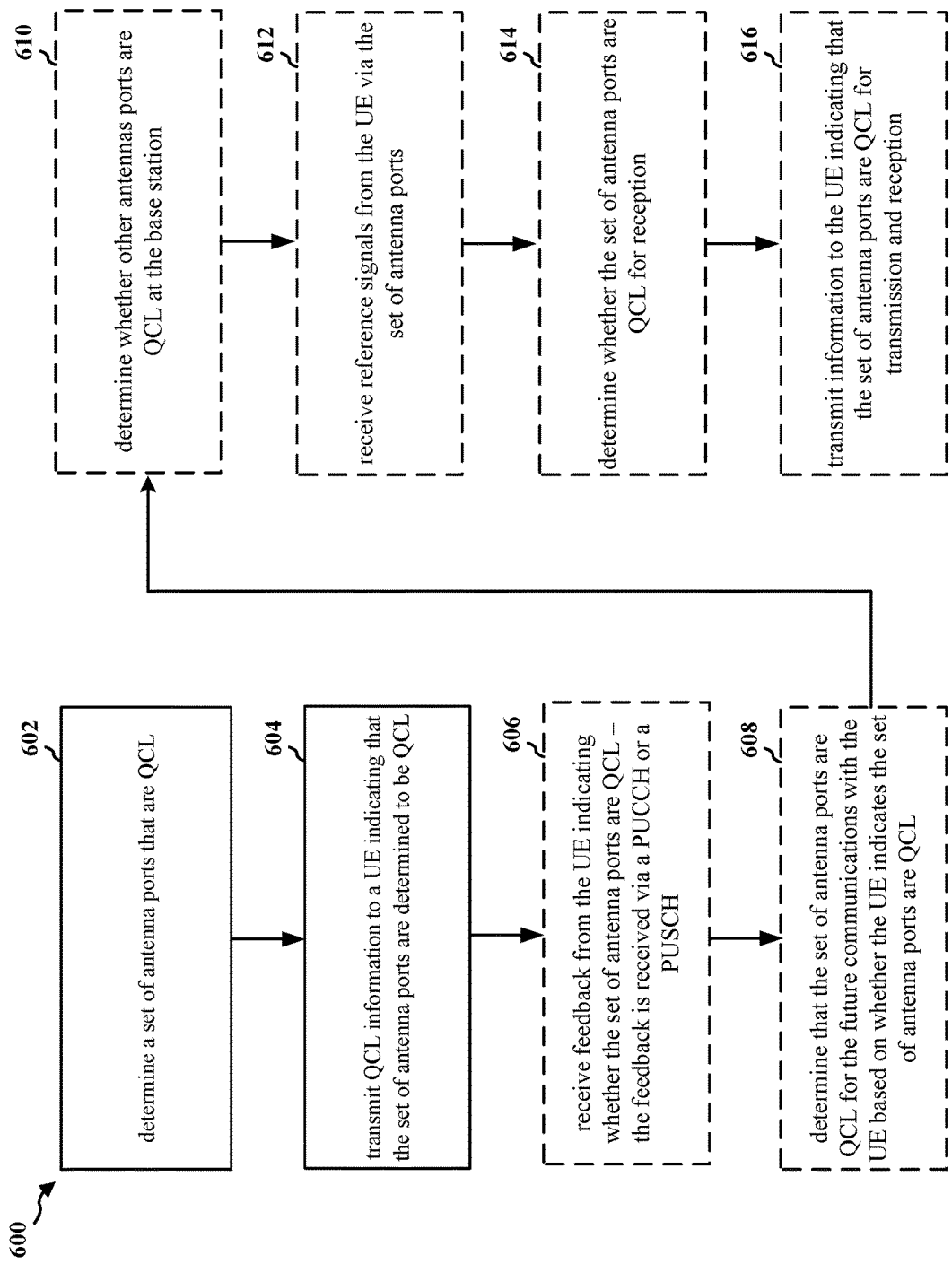
FIGS. 6A and 6B are flowcharts of methods of wireless communication.
Figure 6B:
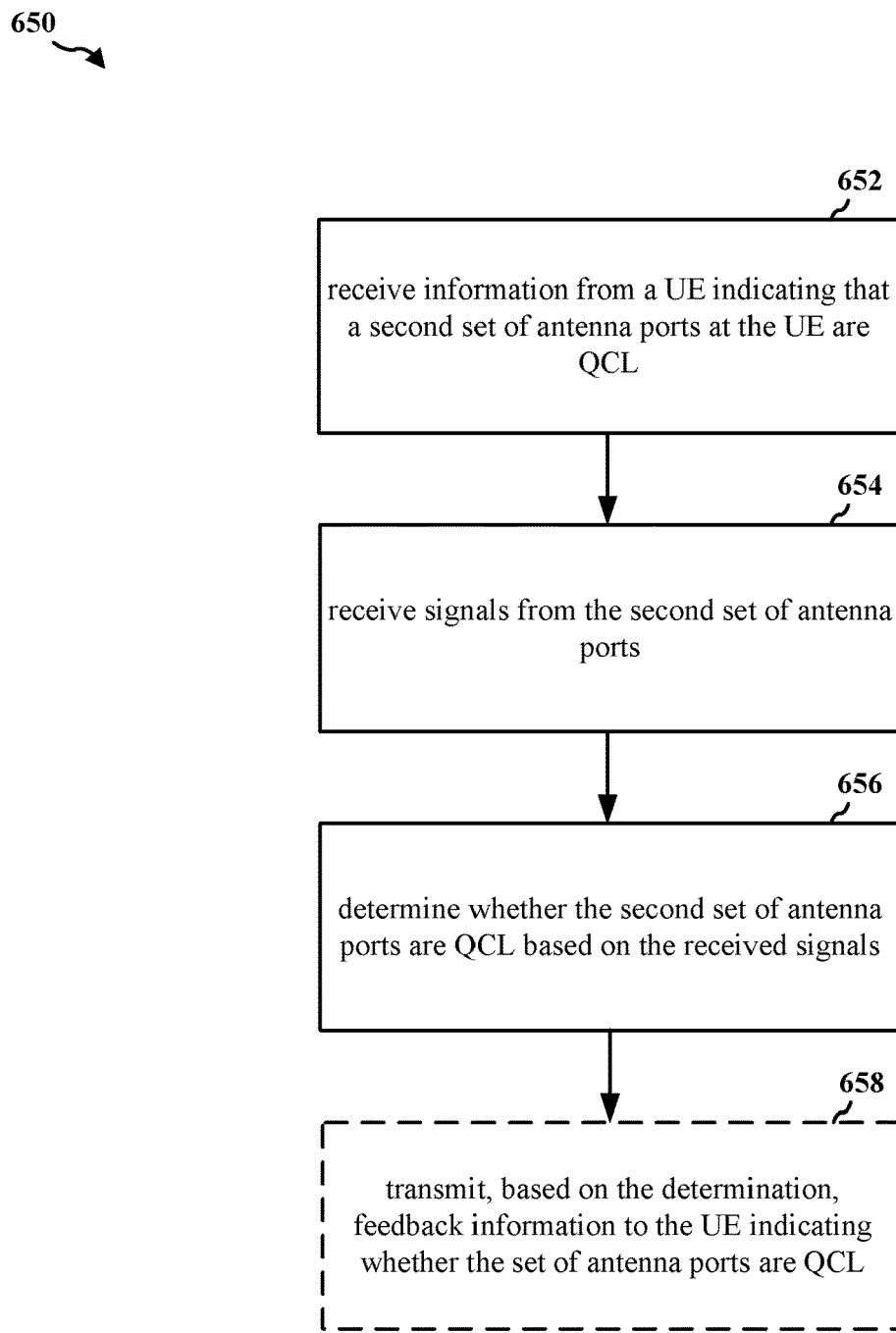

FIGS. 6A and 6B are flowcharts 600, 650 of methods of wireless communication. The method may be performed by a base station (e.g., the base station 402 or the base station 502, or the apparatus 802/802').

Referring to the flow chart 600, at 602, the base station may determine a set of antenna ports that are QCL. For example, referring to FIG. 4, the base station may be the base station 402. The base station 402 may determine that the antenna ports A and B are QCL. The base station 402 may determine that the antenna ports A and B are QCL based on one or more of the angle of arrival at the base station 402, the angle of departure from the base station 402, or the beam widths associated with the antenna ports A and B. For example, the base station 402 may determine the difference between the angle of departures between antenna port A and antenna port B, and if the difference is less at least one of the beam widths (or an average of the beam widths), then the base station 402 may determine that the antenna ports A and B are QCL.

At 604, the base station may transmit QCL information to a UE indicating that the set of antenna ports are determined to be QCL. For example, referring to FIG. 4, the base station 402 may transmit QCL information 406 to the UE 404 indicating that the antenna ports A and B are determined to be QCL. In one aspect, the QCL information may be transmitted via the PDCCH or the PDSCH.

At 606, the base station may receive feedback from the UE indicating whether the set of antenna ports are QCL. The feedback may be received via the PUCCH or the PUSCH. For example, referring to FIG. 4, the base station 402 may receive the QCL feedback 410 from the UE 404 indicating whether antenna ports A and B are QCL.

At 608, the base station may determine that the set of antenna ports are QCL for future communications with the UE based on whether the UE indicates the set of antenna ports are QCL. For example, referring to FIG. 4, the base station 402 may determine that the set of antenna ports A and B are QCL for future communications with the UE 404 based on the indication from the UE 404. For example, if the UE 404 indicates that the antenna ports are not QCL, then the base station 402 may determine that the antenna ports are not QCL for communicating with the UE 404. By contrast, if the UE 404 confirms that the antenna ports are QCL, then the base station 402 may determine that the set of antenna ports are QCL for future communications with the UE 404.

At 610, the base station may determine whether other antenna ports are QCL at the base station. The determination may be based on the received feedback from the UE. For example, referring to FIG. 4, the base station 402 may determine whether other antenna ports are QCL at the base station 402. The determination may be based on the QCL feedback 410 from the UE 404. If the QCL feedback 410 indicates that the antenna ports A and B are QCL, then the base station 402 may not determine whether other antenna ports are QCL at the base station 402. By contrast, if the QCL feedback 410 indicates that the antenna ports A and B are not QCL, then the base station 402 may determine if other antenna ports are QCL. The base station 402 may determine if other antenna ports are QCL by determining an angle of departure for two or more antenna ports and by comparing the difference in the angles of departure to the beam widths of the other antenna ports as discussed previously.

At 612, the base station may receive reference signals from the UE via the set of antenna ports. For example, referring to FIG. 4, the base station 402 may receive the first set of reference signals 412 via the antenna ports A and B.

At 614, the base station may determine whether the set of antenna ports are QCL for reception. For example, referring to FIG. 4, the base station 402 may determine whether antenna ports A and B are QCL for reception. The base station 402 may determine whether antenna ports A and B are QCL for reception by comparing a first signal received at antenna port A and a second signal received at antenna port B. If the first and second signals are sufficiently similar (e.g., similar RSSI), then the base station 402 may determine that the antenna ports A and B are QCL for reception.

At 616, the base station may transmit information to the UE indicating that the set of antenna ports are QCL for transmission and reception. For example, referring to FIG. 4, the base station 402 may transmit information to the UE 404 indicating that the antenna ports A and B are QCL for transmission and reception.

Referring to the flow chart 650, at 652, the base station may receive information from a UE indicating that a set of antenna ports at the UE are QCL. For example, referring to FIG. 5, the base station may be the base station 502, and the UE may be the UE 504. The base station 502 may receive the QCL information 506 from the UE 504. The QCL information 506 may indicate that antenna ports A and B located at the UE 504 are QCL.

At 654, the base station may receive signals from the set of antenna ports. For example, referring to FIG. 5, the base station 502 may receive signals 508 from the UE 504 via the antenna ports A and B. That is, a first set of signals may be received from the antenna port A and the second set of signals may be received from antenna port B.

At 656, the base station may determine whether the set of antenna ports are QCL based on the received signals. In one configuration, the base station may measure a quality of each of the received signals from the antenna ports A and B. The base station may measure one or more of an RSRP, RSSI, RSRQ, SNR, or SINR of each of the signals. For example, referring to FIG. 5, the base station 502 may determine whether the set of antenna ports A and B are QCL by measuring the RSRP and RSSI of the signals received from antenna ports A and B. If the RSRP and/or RSSI are comparable (e.g., within a threshold difference), then the base station 502 may determine that the antenna ports A and B are QCL.

At 658, the base station may transmit, based on the determination, feedback information to the UE indicating whether the set of antenna ports are QCL. For example, referring to FIG. 5, the base station 502 may transmit the QCL information 506 indicating that the antenna ports A and B are QCL.

Figure 7A:
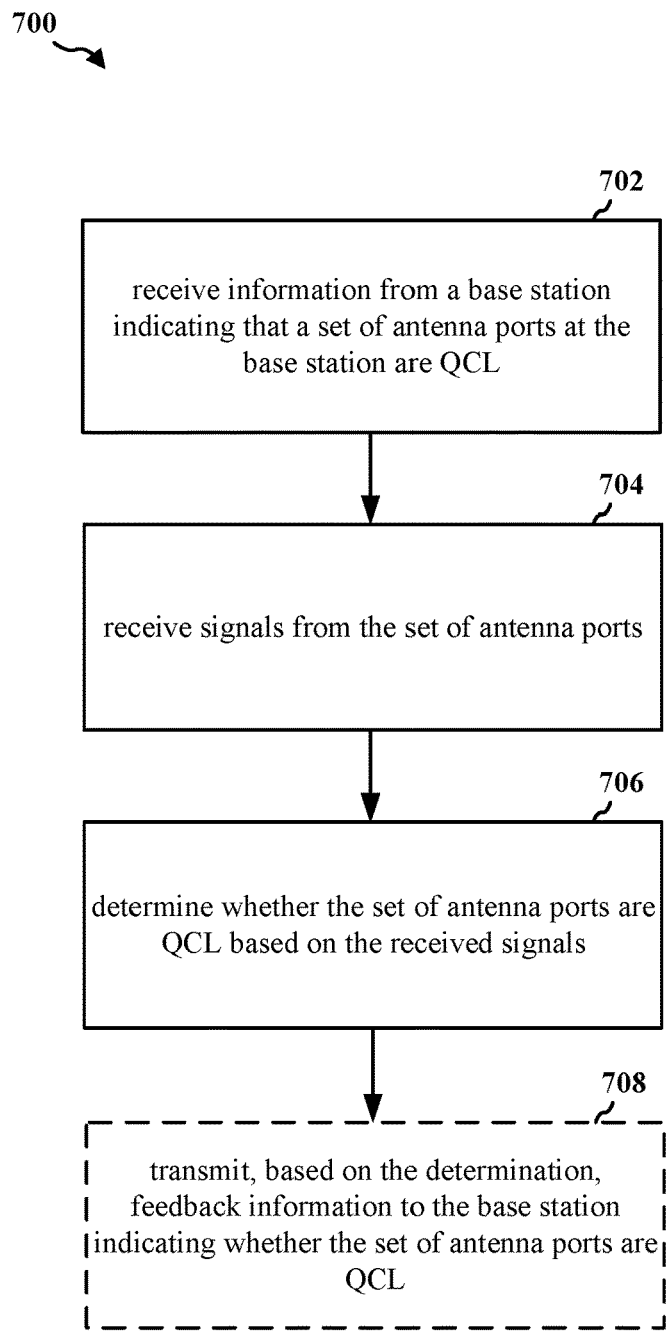
FIGS. 7A and 7B are flowcharts of methods of wireless communication.
Figure 7B:
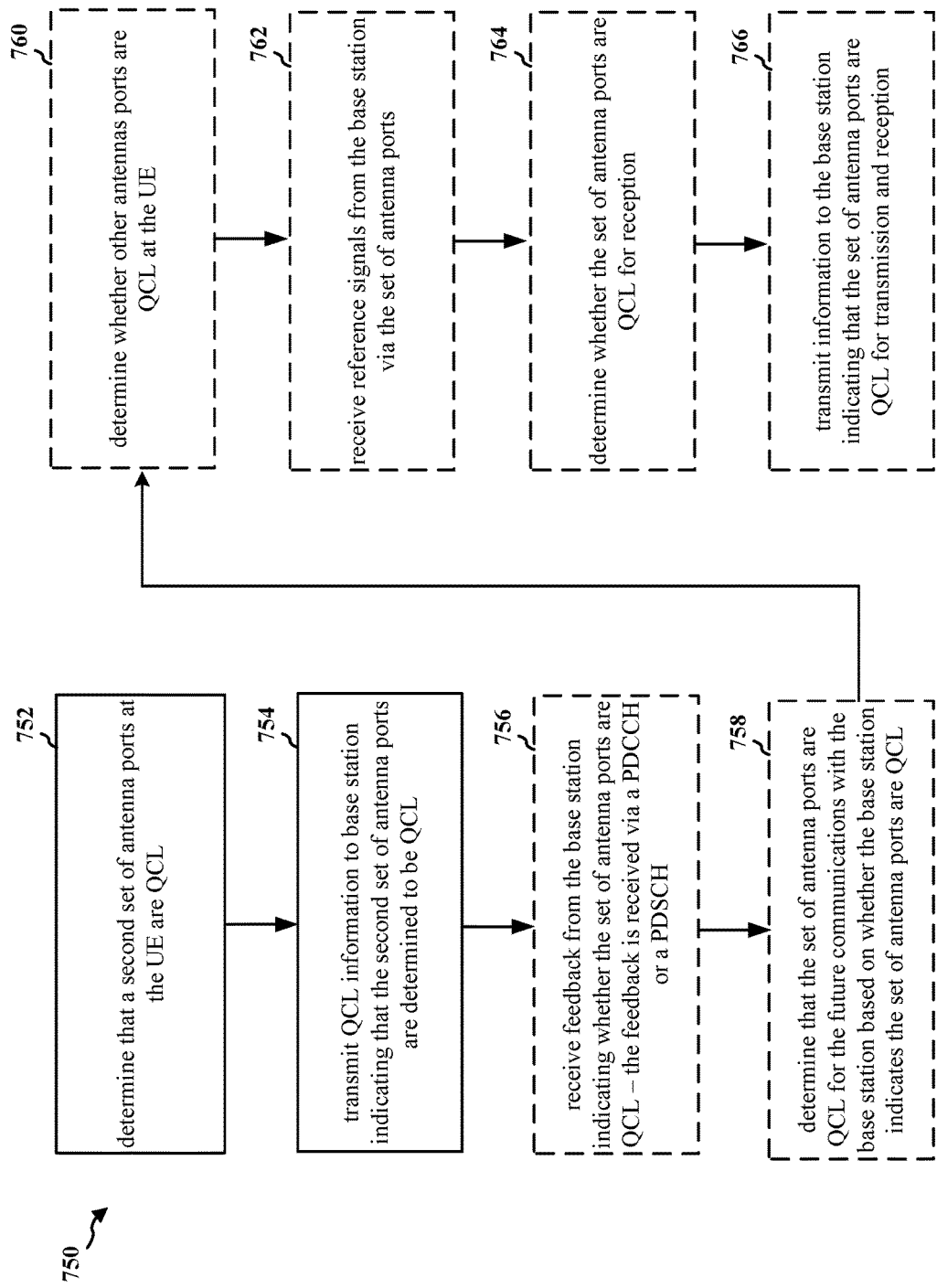

FIGS. 7A and 7B are flowcharts 700, 750 of methods of wireless communication. The method may be performed by a UE (e.g., the UE 404, the UE 504, or the apparatus 1002/1002').

Referring to the flow chart 700, at 702, the UE may receive information from a base station indicating that a set of antenna ports at the base station are QCL. For example, referring to FIG. 4, the UE may be the UE 404, and the base station may be the base station 402. The UE 404 may receive the QCL feedback 410 indicating that the antenna ports A and B at the base station 402 are QCL.

At 704, the UE may receive signals from the set of antenna ports. For example, referring to FIG. 4, the UE 404 may receive the signals 408 from the antenna ports A and B. The UE 404 may receive a first set of signals from antenna port A and a second set of signals from antenna port B.

At 706, the UE may determine whether the set of antenna ports are QCL based on the received signals. For example, referring to FIG. 4, the UE 404 may determine whether the antenna ports A and B are QCL based on the signals 408 received from the base station 402. The UE 404 may determine whether the set of antenna ports A and B are QCL by measuring the RSSI, RSRP, RSRQ, SNR, and/or SINR of the signals 408, which may include a first set of signals from antenna port A and a second set of signals from antenna port B. If one or more of the measurements are comparable for the first set of signals and the second set of signals, then the UE 404 may determine that the set of antenna ports A and B are QCL.

At 708, the UE may transmit, based on the determination, feedback information to the base station indicating whether the set of antenna ports are QCL. For example, referring to FIG. 4, the UE 404 may transmit, based on determination, the QCL feedback 410 indicating that the antenna ports A and B are QCL.

Referring to the flow chart 750, at 752, the UE may determine a set of antenna ports that are QCL. For example, referring to FIG. 5, the UE may be the UE 504. The UE 504 may determine that the antenna ports A and B are QCL. The UE 504 may determine that the antenna ports A and B are QCL based on one or more of the angle of arrival at the UE 504, the angle of departure from the UE 504, or the beam widths associated with the antenna ports A and B. For example, the UE 504 may determine the difference between the angle of departures between antenna port A and antenna port B, and if the difference is less at least one of the beam widths (or an average of the beam widths), then the UE 504 may determine that the antenna ports A and B are QCL.

At 754, the UE may transmit QCL information to a base station indicating that the set of antenna ports are determined to be QCL. For example, referring to FIG. 5, the UE 504 may transmit QCL information 506 to the base station 502 indicating that the antenna ports A and B are determined to be QCL. In one aspect, the QCL information may be transmitted via the PUCCH or the PUSCH.

At 756, the UE may receive feedback from the base station indicating whether the set of antenna ports are QCL.

The feedback may be received via the PDCCH or the PDSCH. For example, referring to FIG. 5, the UE 504 may receive the QCL feedback 510 from the base station 502 indicating whether antenna ports A and B are QCL.

At 758, the UE may determine that the set of antenna ports are QCL for future communications with the base station based on whether the base station indicates the set of antenna ports are QCL. For example, referring to FIG. 5, the UE 504 may determine that the set of antenna ports A and B are QCL for future communications with the base station 502 based on the indication from the base station 502. For example, if the base station 502 indicates that the antenna ports are not QCL, then the UE 504 may determine that the antenna ports are not QCL for communicating with the base station 502. By contrast, if the base station 502 confirms that the antenna ports are QCL, then the UE 504 may determine that the set of antenna ports are QCL for future communications with the base station 502.

At 760, the UE may determine whether other antenna ports are QCL at the base station. The determination may be based on the received feedback from the base station. For example, referring to FIG. 5, the UE 504 may determine whether other antenna ports are QCL at the UE 504. The determination may be based on the QCL feedback 510 from the base station 502. If the QCL feedback 510 indicates that the antenna ports A and B are QCL, then the UE 504 may not determine whether other antenna ports are QCL at the UE 504. By contrast, if the QCL feedback 510 indicates that the antenna ports A and B are not QCL, then the UE 504 may determine if other antenna ports are QCL. The UE 504 may determine if other antenna ports are QCL by determining an angle of departure for two or more antenna ports and by comparing the difference in the angles of departure to the beam widths of the other antenna ports as discussed previously.

At 762, the UE may receive reference signals from the base station via the set of antenna ports. For example, referring to FIG. 5, the UE 504 may receive a first set of reference signals via the antenna ports A and B.

At 764, the UE may determine whether the set of antenna ports are QCL for reception. For example, referring to FIG. 5, the UE 504 may determine whether antenna ports A and B are QCL for reception. The UE 504 may determine whether antenna ports A and B are QCL for reception by comparing a first signal received at antenna port A and a second signal received at antenna port B. If the first and second signals are sufficiently similar (e.g., similar RSSI), then the UE 504 may determine that the antenna ports A and B are QCL for reception.

At 716, the UE may transmit information to the base station indicating that the set of antenna ports are QCL for transmission and reception. For example, referring to FIG. 5, the UE 504 may transmit information to the base station 502 indicating that the antenna ports A and B are QCL for transmission and reception.

Figure 8:
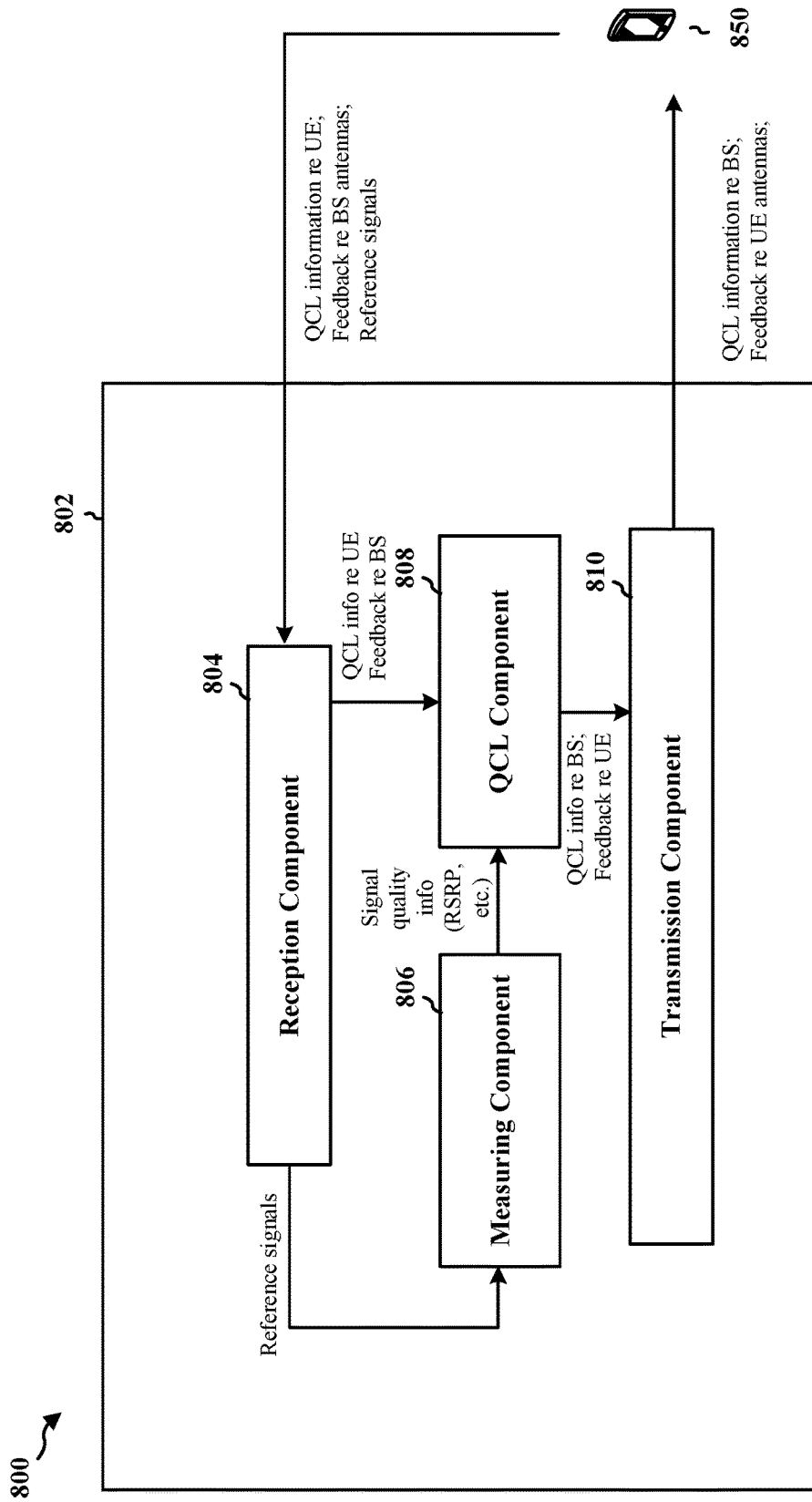
FIG. 8 is a conceptual data flow diagram illustrating the data flow between different means/components in an exemplary apparatus.

FIG. 8 is a conceptual data flow diagram 800 illustrating the data flow between different means/components in an exemplary apparatus 802. The apparatus may be a base station (e.g., the mmW base station 180). The apparatus includes a reception component 804, a measuring component 806, a QCL component 808, and a transmission component 810.

In one configuration, the QCL component 808 may be configured to determine a set of antenna ports that are QCL at the apparatus. The transmission component 810 may be configured to transmit QCL information to a UE indicating that the set of antenna ports are determined to be QCL. In an aspect, the determination may be based on an angle of departure at the apparatus and a beam width for each antenna port of the set of antenna ports. In another aspect, the QCL information may be transmitted via a PDCCH or via a PDSCH. In another embodiment, the reception component 804 may be configured to receive feedback from the UE indicating whether the set of antenna ports are QCL at the apparatus. The feedback may be received via a PUCCH or a PUSCH. In another embodiment, the QCL component 808 may be configured to determine that the set of antenna ports are QCL for the future communications with the UE, if the UE indicates the set of antenna ports are QCL In another embodiment, the QCL component 808 may be configured to determine whether other antennas ports are QCL at the apparatus. In another embodiment, the reception component 804 may be configured to receive reference signals from the UE via the set of antenna ports, and the QCL component 808 may be configured to determine whether the set of antenna ports are QCL for reception. In another embodiment, the transmission component 810 may be configured to transmit information to the UE indicating that the set of antenna ports are QCL for transmission and reception. In an aspect, at least one of an angle of arrival or an angle of departure may be used to determine that the set of antenna ports are QCL. In another aspect, only the angle of arrival may be used to determine that the set of antenna ports are QCL if receive beamforming is considered. In another aspect, only the angle of departure is used to determine that the set of antenna ports are QCL if transmit beamforming is considered. In another aspect, the set of antenna ports at the base station are defined to be QCL. In another aspect, a second set of antenna ports at the UE are defined to be QCL.

In another configuration, the reception component 804 may be configured to receive information from a UE indicating that a set of antenna ports at the UE are QCL and to receive signals from the set of antenna ports. In this configuration, the QCL component 808 may be configured to determine whether the set of antenna ports are QCL based on the received signals. In an aspect, the determination may be based on receiving signals from all ports within the set of ports using a same receiver beam at the base station. In an embodiment, the QCL component 808 may be configured to determine whether the set of antenna ports are QCL by measuring a quality of the received signals from the set of antenna ports. In an aspect, the QCL component 808 may be configured to measure the signal quality by measuring the quality of the received signal by measuring one or more of a RSRP, a RSSI, a RSRQ, an SNR, or an SINR. In another embodiment, the transmission component 810 may be configured to transmit, based on the determination, feedback information to the UE indicating whether the set of antenna ports are QCL.

The apparatus may include additional components that perform each of the blocks of the algorithm in the aforementioned flowcharts of FIGS. 6A and 6B. As such, each block in the aforementioned flowcharts of FIGS. 6A and 6B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
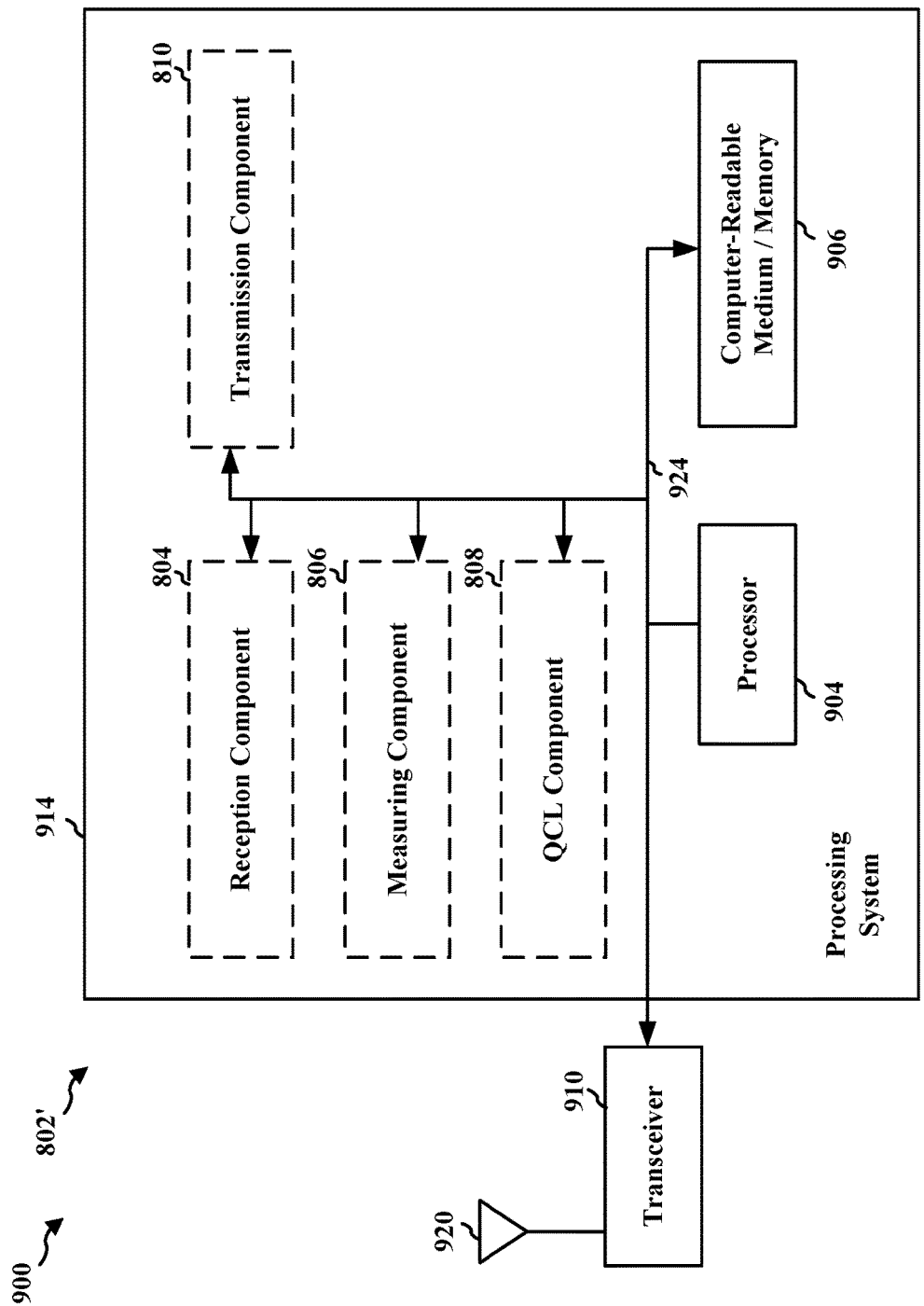
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810 and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 810, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810. The components may be software components running in the processor 904, resident/stored in the computer readable medium/memory 906, one or more hardware components coupled to the processor 904, or some combination thereof. The processing system 914 may be a component of the eNB 310 and may include the memory 376 and/or at least one of the TX processor 316, the RX processor 370, and the controller/processor 375.

In one configuration, the apparatus 802/802' for wireless communication includes means for determining a set of antenna ports that are QCL at the apparatus. The apparatus may include means for transmitting QCL information to a UE indicating that the set of antenna ports are determined to be QCL. In an aspect, the determination may be based on an angle of departure at the apparatus and a beam width for each antenna port of the set of antenna ports. In another aspect, the QCL information may be transmitted via a PDCCH or via a PDSCH. In another embodiment, the reception component 804 may be configured to receive feedback from the UE indicating whether the set of antenna ports are QCL at the apparatus. The feedback may be received via a PUCCH or a PUSCH. In another embodiment, the apparatus may include means for determining that the set of antenna ports are QCL for the future or subsequent communications with the UE, if the UE indicates the set of antenna ports are QCL. In another embodiment, the apparatus may include means for determining whether other antennas ports are QCL at the apparatus. In another embodiment, the apparatus may include means for receiving reference signals from the UE via the set of antenna ports, and the apparatus may include means for determining whether the set of antenna ports are QCL for reception. In another embodiment, the apparatus may include means for transmitting information to the UE indicating that the set of antenna ports are QCL for transmission and reception. In an aspect, at least one of an angle of arrival or an angle of departure may be used to determine that the set of antenna ports are QCL. In another aspect, only the angle of arrival may be used to determine that the set of antenna ports are QCL if receive beamforming is considered. In another aspect, only the angle of departure is used to determine that the set of antenna ports are QCL if transmit beamforming is considered. In another aspect, the set of antenna ports at the base station are defined to be QCL. In another aspect, a second set of antenna ports at the UE are defined to be QCL.

In another configuration, the apparatus may include means for receiving information from a UE indicating that a set of antenna ports at the UE are QCL and to receive signals from the set of antenna ports. In this configuration, the apparatus may include means for determining whether the set of antenna ports are QCL based on the received signals. In an aspect, the determination may be based on receiving signals from all ports within the set of ports using a same receiver beam at the base station. In an embodiment, the means for determining whether the set of antenna ports are QCL may be configured to measure a quality of the received signals from the set of antenna ports. In an aspect, the means for determining whether the set of antenna ports are QCL may be configured to measure the signal quality of the received signal by measuring one or more of a RSRP, a RSSI, a RSRQ, an SNR, or an SINR. In another embodiment, the apparatus may include means for transmitting, based on the determination, feedback information to the UE indicating whether the set of antenna ports are QCL. The aforementioned means may be one or more of the aforementioned components of the apparatus 802 and/or the processing system 914 of the apparatus 802' configured to perform the functions recited by the aforementioned means. As described supra, the processing system 914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 10:
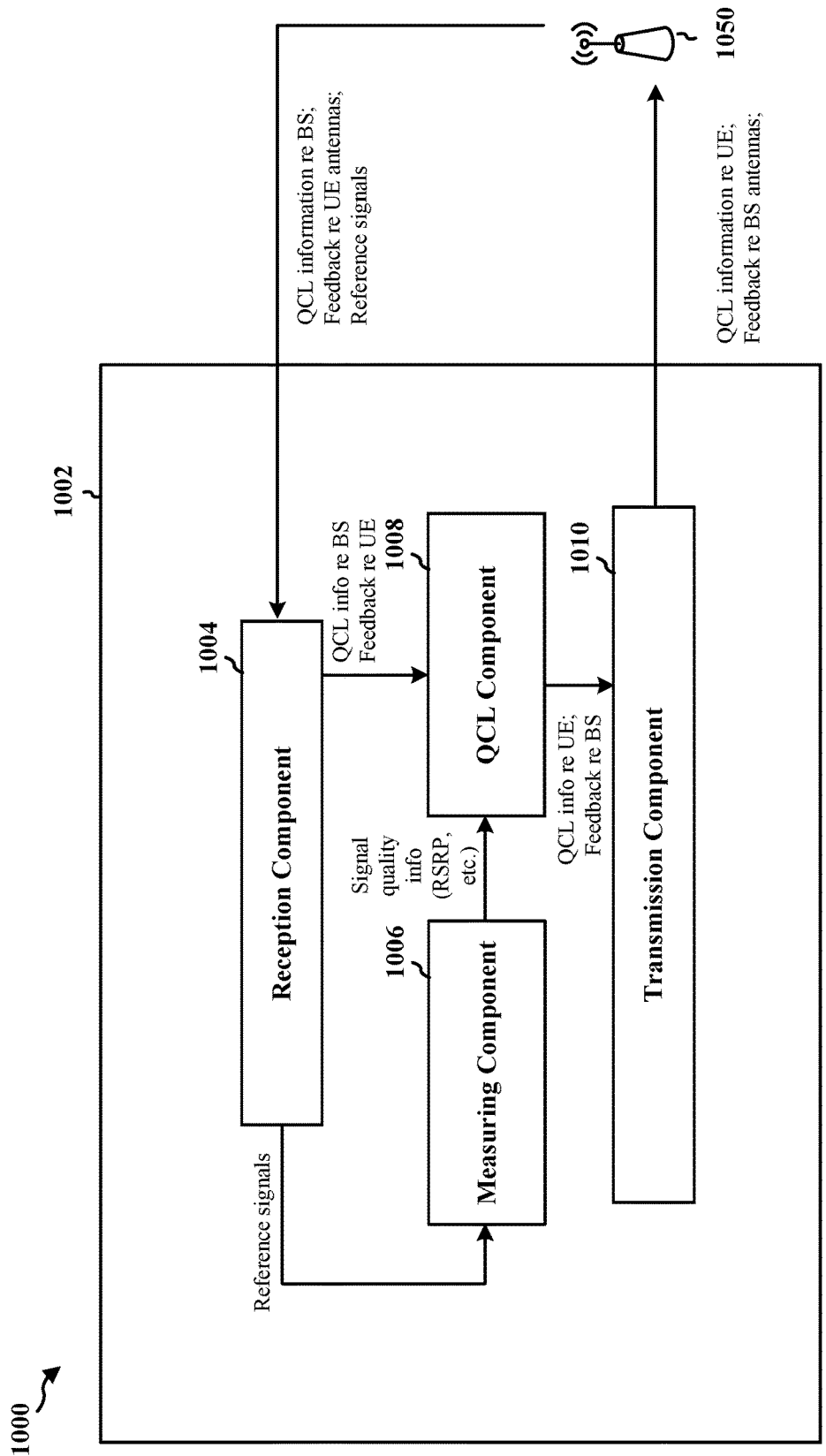
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a UE. The apparatus includes a reception component 1004, a measuring component 1006, a QCL component, and a transmission component 1010.

In one configuration, the reception component 1004 may be configured to receive information from a base station indicating that a set of antenna ports at the base station are QCL. The reception component 1004 may be configured to receive signals from the set of antenna ports. The QCL component 1008 may be configured to determine whether the set of antenna ports are QCL based on the received signals. In an aspect, the determination may be based on receiving signals from all ports within the set of ports using a same receiver beam at the apparatus. In an embodiment, the measuring component 1006 and/or the QCL component 1008 may be configured to determine whether the set of antenna ports are QCL by measuring a quality of the receiving signals from the set of antenna ports. In another embodiment, the measuring component 1006 and/or the QCL component 1008 may be configured to measure the quality of the signals by measuring one or more of a RSRP, a RSSI, a RSRQ, an SNR, or an SINR. In another embodiment, the transmission component 1010 may be configured to transmit, based on the determination, feedback information to the base station indicating whether the set of antenna ports are QCL.

In another configuration, the QCL component 1008 may be configured to determine that a set of antenna ports at the UE are QCL. The transmission component 1010 may be configured to transmit QCL information to a base station indicating that the set of antenna ports are determined to be QCL. In an aspect, the determination may be based on an angle of departure at the apparatus and a beam width for each antenna port of the second set of antenna ports. In another aspect, the QCL information is transmitted via a PUCCH or a PUSCH. In another embodiment, the reception component 1004 may be configured to receive feedback from the base station indicating whether the set of antenna ports are QCL. The feedback may be received via a PDCCH or via a PDSCH. In another embodiment, the QCL component 1008 may be configured to determine that the set of antenna ports are QCL for the future communications with the base station based on whether the base station indicates the set of antenna ports are QCL. In another embodiment, the QCL component 1008 may be configured to determine whether other antennas ports are QCL at the apparatus. In another configuration, the reception component 1004 may be configured to receive reference signals from the base station via the set of antenna ports. The QCL component 1008 may be configured to determine whether the set of antenna ports are QCL for reception. In another embodiment, the transmission component 1010 may be configured to transmit information to the base station indicating that the set of antenna ports are QCL for transmission and reception.

The apparatus may include additional components that perform each of the blocks of the algorithm in the aforementioned flowcharts of FIGS. 7A and 7B. As such, each block in the aforementioned flowcharts of FIGS. 7A and 7B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
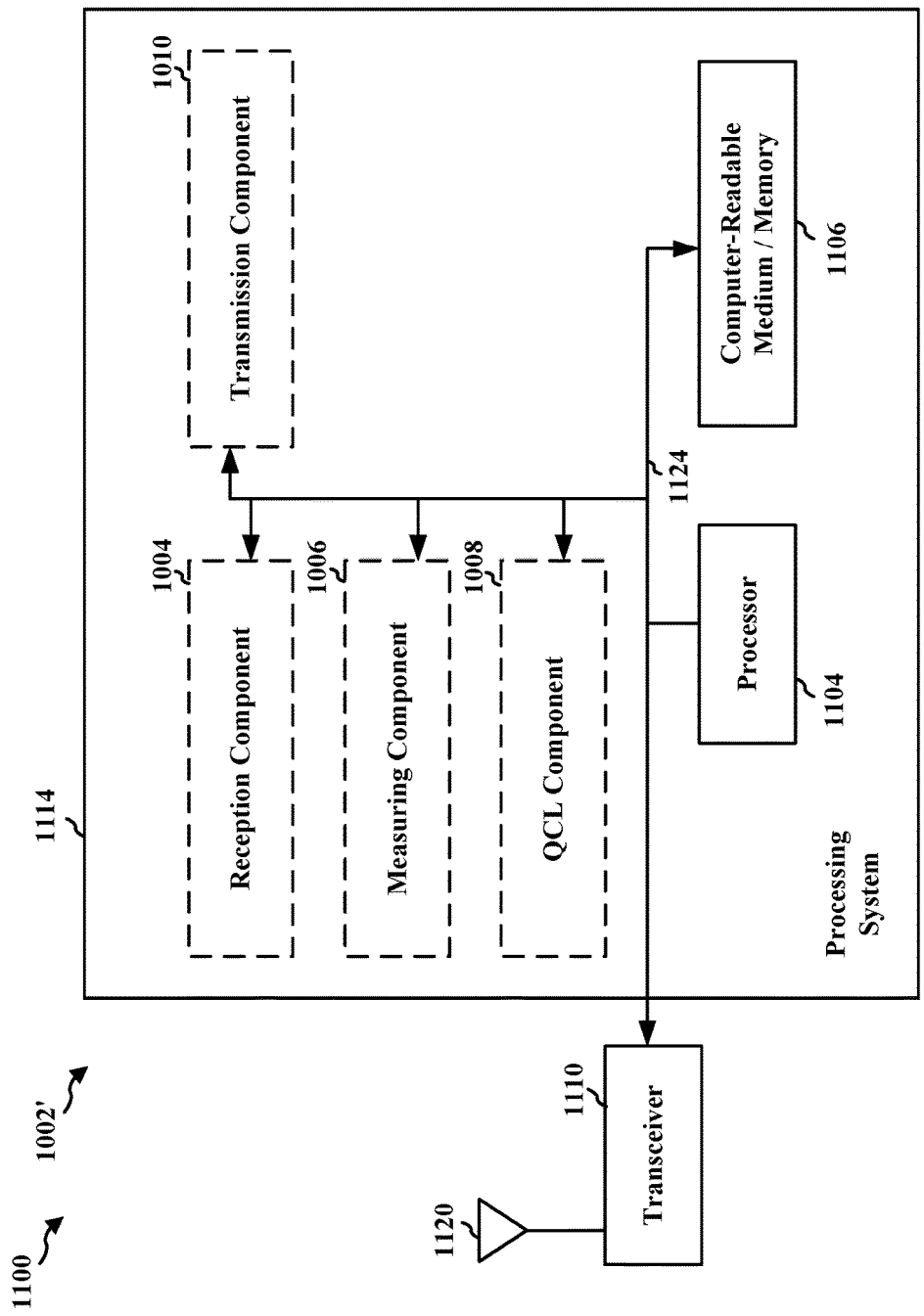
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication includes means for receiving information from a base station indicating that a set of antenna ports at the base station are QCL. The apparatus may include means for receiving signals from the set of antenna ports. The apparatus may include means for determining whether the set of antenna ports are QCL based on the received signals. In an aspect, the determination may be based on receiving signals from all ports within the set of ports using a same receiver beam at the apparatus. In an embodiment, the means for determining whether the set of antenna ports are QCL may be configured to measure a quality of the receiving signals from the set of antenna ports. In another embodiment, the means for determining whether the set of antenna ports are QCL may be configured to measure the quality of the signals by measuring one or more of a RSRP, a RSSI, a RSRQ, an SNR, or an SINR. In another embodiment, the apparatus may include means for transmitting, based on the determination, feedback information to the base station indicating whether the set of antenna ports are QCL.

In another configuration, the apparatus may include means for determining that a set of antenna ports at the apparatus are QCL. The apparatus may include means for transmitting QCL information to a base station indicating that the set of antenna ports are determined to be QCL. In an aspect, the determination may be based on an angle of departure at the apparatus and a beam width for each antenna port of the second set of antenna ports. In another aspect, the QCL information is transmitted via a PUCCH or a PUSCH. In another embodiment, the apparatus may include means for receiving feedback from the base station indicating whether the set of antenna ports are QCL. The feedback may be received via a PDCCH or via a PDSCH. In another embodiment, the apparatus may include means for determining that the set of antenna ports are QCL for the future or subsequent communications with the base station based on whether the base station indicates the set of antenna ports are QCL. In another embodiment, the apparatus may include means for determining whether other antennas ports are QCL at the apparatus. In another configuration, the apparatus may include means for receiving reference signals from the base station via the set of antenna ports. The apparatus may include means for determining whether the set of antenna ports are QCL for reception. In another embodiment, the apparatus may include means for transmitting information to the base station indicating that the set of antenna ports are QCL for transmission and reception. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

In the downlink, two or more ports are declared QCL with the following parameters to assist with more efficient beamforming: Angle of departure at the base station, Beam width. Base station also informs that these ports are quasi-co-located with the ports that will be used for future communication. Base station conveys these information to the UE through PDCCH or PDSCH. Upon receiving this information, UE checks if it can receive signal from these antenna ports of the BS using same subarray and/or same beam. UE decides if these two ports are quasi co-located. UE informs its decision to the BS through PUCCH or PUSCH. Upon receiving UE's feedback, base station decides if it should assume these two antenna ports to be quasi co-located for that particular UE. If these antenna ports quasi co-located, UE could find different large scale parameters, e.g. delay spread, average gain etc. of antenna port from the other one. If UE assumes that these antenna ports are not quasi co-located, base station can try with new antenna ports and see if those antenna ports are quasi co-located or not. In the uplink, two or more ports are declared QCL with the following parameters to assist with more efficient beamforming: Angle of departure at the UE, Beam width. UE also informs that these ports are quasi-co-located with the ports that will be used for future communication. UE conveys these information to the BS through PUCCH or PUSCH. Upon receiving this information, BS checks if it can receive signal from these antenna ports of the UE using same subarray and/or same beam. BS decides if these two ports are quasi co-located. BS informs its decision to the BS through PDCCH or PDSCH. Upon receiving BS's feedback, UE decides if it should assume these two antenna ports to be quasi co-located for that particular BS. If these antenna ports quasi co-located, BS could find different large scale parameters, e.g. delay spread, average gain etc. of one antenna port from the other one. If BS assumes that these antenna ports are not quasi co-located, UE can try with new antenna ports and see if those antenna ports are quasi co-located or not. For QCL determination between Tx and Rx antenna ports, UE transmits SRS to the base station using the same subarray and/or same beam. Base station receives SRS from the UE using two different antenna ports. Base station later transmits reference signal using the same two antenna ports. UE decides if it can receive base station's signal using the same subarray and/or same beam. If UE can, base station decides that the transmit and receive antenna ports of its side are quasi co-located. BS informs the UE that there is a correspondence between the transmit and receive antenna ports.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a base station, comprising:
    determining a set of antenna ports that are quasi co-located (QCL), wherein the determination is based on an angle of departure from the base station if transmit beamforming is considered; and
    transmitting QCL information to a user equipment (UE) indicating that the set of antenna ports are determined to be QCL.

2. The method of claim 1, wherein the QCL information is associated with a physical downlink control channel (PDCCH) or a physical downlink shared channel (PDSCH).

3. A method of wireless communication by a base station, comprising:
    determining a set of antenna ports that are quasi co-located (QCL), wherein the determination is based on an angle of arrival at the base station if receive beamforming is considered; and transmitting QCL information to a user equipment (UE) indicating that the set of antenna ports are determined to be QCL.

4. The method of claim 3 wherein the QCL information is associated with a physical downlink control channel (PDCCH) or a physical downlink shared channel (PDSCH).

5. A method of wireless communication by a user equipment (UE), comprising:
receiving quasi co-located (QCL) information from a base station indicating that a set of antenna ports at the base station are determined to be QCL, wherein the QCL information is based on an average delay or a delay spread associated with each antenna port of the set of antenna ports and an angle of arrival at the base station, an angle of departure from the base station, or a beam width for each antenna port of the set of antenna ports; and
assuming, after receiving the QCL information from the base station, that the set of antenna ports are QCL with respect to the received QCL information.

6. A method of wireless communication by a user equipment (UE), comprising:
receiving quasi co-located (QCL) information from a base station indicating that a set of antenna ports at the base station are determined to be QCL wherein the QCL information is associated with a physical downlink control channel (PDCCH) or a physical downlink shared channel (PDSCH) and is based on an angle of arrival at the base station, an angle of departure from the base station, or a beam width for each antenna port of the set of antenna ports; and
assuming, after receiving the QCL information from the base station, that the set of antenna ports are QCL with respect to the received QCL information.

7. A base station for wireless communication, comprising:
a memory; and
at least one processor coupled to the memory and configured to:
determine a set of antenna ports that are quasi co-located (QCL), wherein the determination is based on an angle of arrival at the base station if receive beamforming is considered; and
transmit QCL information to a user equipment (UE) indicating that the set of antenna ports are determined to be QCL.

8. The base station of claim 7, wherein the QCL information is associated with a physical downlink control channel (PDCCH) or a physical downlink shared channel (PDSCH).

9. A base station for wireless communication, comprising:
a memory; and
at least one processor coupled to the memory and configured to:
determine a set of antenna ports that are quasi co-located (QCL), wherein the determination is based on an angle of departure from the base station if transmit beamforming is considered; and
transmit QCL information to a user equipment (UE) indicating that the set of antenna ports are determined to be QCL.

10. The base station of claim 9,
the QCL information is associated with a physical downlink control channel (PDCCH) or a physical downlink shared channel (PDSCH).

11. A user equipment (UE) for wireless communication, comprising:
a memory; and
at least one processor coupled to the memory and configured to:
receive quasi co-located (QCL) information from a base station indicating that a set of antenna ports at the base station are determined to be QCL, wherein the QCL information is based on an average delay or a delay spread associated with each antenna port of the set of antenna ports and an angle of arrival at the base station, an angle of departure from the base station, or a beam width for each antenna port of the set of antenna ports; and
assume, after receiving the QCL information from the base station, that the set of antenna ports are QCL with respect to the received QCL information.

12. A user equipment (UE) for wireless communication, comprising:
a memory; and
at least one processor coupled to the memory and configured to:
receive quasi co-located (QCL) information from a base station indicating that a set of antenna ports at the base station are determined to be QCL, wherein the QCL information is associated with a physical downlink control channel (PDCCH) or a physical downlink shared channel (PDSCH) and is based on an angle of arrival at the base station, an angle of departure from the base station or a beam width for each antenna port of the set of antenna ports; and
assume, after receiving the QCL information from the base station, that the set of antenna ports are QCL with respect to the received QCL information.

13. A base station for wireless communication, comprising:
means for determining a set of antenna ports that are quasi co-located (QCL), wherein the determination is based on an angle of arrival at the base station if receive beamforming is considered; and
means for transmitting QCL information to a user equipment (UE) indicating that the set of antenna ports are determined to be QCL.

14. The base station of claim 13, wherein the QCL information is associated with a physical downlink control channel (PDCCH) or a physical downlink shared channel (PDSCH).

15. A base station for wireless communication, comprising:
means for determining a set of antenna ports that are quasi co-located (QCL), wherein the determination is based on an angle of departure from the base station if transmit beamforming is considered; and
means for transmitting QCL information to a user equipment (UE) indicating that the set of antenna ports are determined to be QCL.

16. The base station of claim 15, wherein the QCL information is associated with a physical downlink control channel (PDCCH) or a physical downlink shared channel (PDSCH).

17. A user equipment (UE) for wireless communication, comprising:
means for receiving quasi co-located (QCL) information from a base station indicating that a set of antenna ports at the base station are determined to be QCL, wherein the QCL information is based on one or more of an angle of arrival at the base station, an angle of departure from the base station, or a beam width for each antenna port of the set of antenna ports; and means for determining the set of antenna ports are QCL based on the received QCL information
means for assuming, after receiving the QCL information from the base station, that the set of antenna ports are QCL with respect to the received QCL information.

18. The UE of claim 17, wherein the QCL information is associated with a physical downlink control channel (PDCCH) or a physical downlink shared channel (PDSCH).

* * * * *